United States Patent
Millet et al.

(10) Patent No.: US 8,181,059 B2
(45) Date of Patent: May 15, 2012

(54) INTER-PROCESSOR COMMUNICATION CHANNEL INCLUDING POWER-DOWN FUNCTIONALITY

(75) Inventors: Timothy Millet, Mountain View, CA (US); Binu K. Mathew, Menlo Park, CA (US); Stephan Vincent Schell, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 607 days.

(21) Appl. No.: 12/238,700

(22) Filed: Sep. 26, 2008

(65) Prior Publication Data

US 2010/0083026 A1 Apr. 1, 2010

(51) Int. Cl.
*G06F 1/04* (2006.01)
*G06F 1/00* (2006.01)

(52) U.S. Cl. ........ 713/601; 713/300; 713/310; 713/320; 713/324

(58) Field of Classification Search .................. 713/300, 713/310, 320, 324, 601
See application file for complete search history.

(56) References Cited

U.S. PATENT DOCUMENTS

| | | | |
|---|---|---|---|
| 5,341,470 A | 8/1994 | Simpson et al. | |
| 6,385,208 B1* | 5/2002 | Findlater et al. | 370/419 |
| 6,738,068 B2 | 5/2004 | Cohen et al. | |
| 6,865,189 B2* | 3/2005 | Senthil et al. | 370/466 |
| 6,943,667 B1 | 9/2005 | Kammer et al. | |
| 7,031,333 B1* | 4/2006 | Findlater et al. | 370/419 |
| 7,042,893 B1* | 5/2006 | Lo et al. | 370/419 |
| 7,127,521 B2* | 10/2006 | Hsu et al. | 709/233 |
| 7,506,188 B2 | 3/2009 | Krantz et al. | |
| 7,688,728 B2* | 3/2010 | Ardhanari et al. | 370/230.1 |
| 7,865,744 B2* | 1/2011 | Lee et al. | 713/300 |
| 7,898,994 B2* | 3/2011 | Zhao et al. | 370/311 |
| 7,899,135 B2* | 3/2011 | May | 375/324 |
| 2003/0226050 A1* | 12/2003 | Yik et al. | 713/324 |
| 2005/0030306 A1 | 2/2005 | Lan et al. | |
| 2007/0140199 A1* | 6/2007 | Zhao et al. | 370/338 |
| 2008/0168285 A1 | 7/2008 | de Cesare et al. | |
| 2010/0083023 A1 | 4/2010 | Bjegovic et al. | |
| 2010/0164962 A1 | 7/2010 | Sakariya et al. | |

FOREIGN PATENT DOCUMENTS

WO WO2008/016424 2/2008

OTHER PUBLICATIONS

Cisco Systems, Inc—"Serial-MII Specification", Revision 2.1; 7 pages dated Feb. 9, 2000.*
Invitation to Pay Additional Fees, PCT Application No. PCT/US2009/056210, 7 pages, Dec. 14, 2009.
International Search Report, PCT Application No. PCT/US2009/056210, 6 pages, Mar. 17, 2010.

* cited by examiner

*Primary Examiner* — Brian Misiura
(74) *Attorney, Agent, or Firm* — Dorsey & Whitney LLP

(57) ABSTRACT

Apparatuses and methods are disclosed for implementing an inter-processor communication channel including power-down functionality. In one embodiment, the apparatus may comprise a first integrated circuit (IC), a second IC coupled to the first IC via a communication interface, wherein the first IC is in one or more low power states and unable to monitor the communication interface. The apparatus may further comprise an inter-processor communication (IPC) channel coupled between the first and second ICs, wherein the IPC channel is separate from the communication interface and wherein the second IC generates at least one advisory signal to the first IC via the IPC channel.

12 Claims, 9 Drawing Sheets

INTER-PROCESSOR COMMUNICATION CHANNEL INCLUDING POWER-DOWN FUNCTIONALITY

TECHNICAL FIELD

The present invention relates generally to conserving power within electronic devices, and more particularly to power management schemes for two or more semiconductor devices communicating over an inter-processor communication channel.

BACKGROUND

Electronic devices are ubiquitous in society and can be found in everything from wristwatches to cellular telephones. With the proliferation of integrated circuitry, these electronic devices are becoming more and more sophisticated. Some electronic devices may include systems-on-a-chip (SOCs) that may integrate different components associated with the various functions of the electronic device into a single integrated circuit. As part of this trend toward increasing sophistication, many of the SOCs often need to communicate with each other as well as communicate with other integrated circuits external to the electronic devices.

Another growing trend with electronic devices is increasing power consumption. Generally, electronic devices often consume greater power than their predecessors, in part due to their increasing levels of functionality. In the case of mobile electronic devices, such as laptops and/or cellular telephones, increased power consumption may be detrimental because it may consume precious battery life. These power problems are exacerbated when the mobile electronic device also includes radio capabilities, such as Bluetooth, WiFi™, and so on. Many mobile electronic devices contain radio capabilities.

Accordingly, there is a need for providing power management to electronic devices implementing SOCs and that have radio capabilities.

SUMMARY

Apparatuses and methods are disclosed for implementing an inter-processor communication channel including power-down functionality. In one embodiment, the apparatus may include a first integrated circuit (IC), and a second IC coupled to the first IC via a communication interface, wherein the first IC may occupy one or more low power states during which it does not monitor the communication interface. The apparatus may further include an inter-processor communication (IPC) channel coupled between the first and second ICs. The IPC channel may be separate from the communication interface, further the second IC may generate at least one advisory signal, and transmit such a signal to the first IC via a sideband of the IPC channel.

Another embodiment may include a method of managing power within an electronic device. The method may include the operations of monitoring at least one transmission signal on an interface, monitoring at least one receive signal on the interface, delaying a synchronization signal on the interface and concurrently determining whether data is present on the at least one transmission signal or present on the at least one receive signal, and, in the event that the determination is positive, selectively entering a low power state of the electronic device after a synchronization signal has been received.

Another embodiment may include a computer system, comprising a central processing unit (CPU), a memory coupled to the CPU, a system on a chip (SOC) coupled to the CPU, a radio coupled to the SOC using a serial-media-independent-interface (SMII), the radio comprising a clock generator, wherein the clock generator provides a synchronous timing signal to the SMII, and a power management unit (PMU) coupled to both the SOC and the radio, wherein the PMU is configured to provide an advisory power down signal to the SOC as directed by the radio.

DETAILED DESCRIPTION OF THE INVENTION

The following discussion describes various embodiments that may reduce the power consumption of electronic devices. Although one or more of these embodiments may be described in detail, the embodiments disclosed should not be interpreted or otherwise used as limiting the scope of the disclosure, including the claims. In addition, one skilled in the art will understand that the following description has broad application. Accordingly, the discussion of any embodiment is meant only to be exemplary and is not intended to intimate that the scope of the disclosure, including the claims, is limited to these embodiments.

One embodiment may take the form of an electronic device that may include a first integrated circuit (IC), a second IC coupled to the first IC via a communication interface, wherein the first IC is in one or more low power states and unable to monitor the communication interface. The electronic device may further include an IPC channel coupled between the first and second ICs, wherein the IPC channel is separate from the communication interface and wherein the second IC generates at least one advisory signal to the first IC via the IPC channel. The second IC may include a clock a generation circuit, where the clock generation circuit provides a synchronous timing signal for the IPC Channel and the timing signal may be selectively scaled by the second IC. The electronic device further may include a PMU coupled to both the first and second ICs, and the PMU may be configured to selectively power up the first IC (as directed by the second IC) using one or more sideband signals. In this manner, the second IC may generate a sufficient but not necessary condition for the first IC to power up. As a result of implementing the clock scaling and the sideband signals, power management may be achieved for the electronic device while maintaining the SMII interface and limiting the processing overhead associated with entering and exiting low power states.

Figure 1:
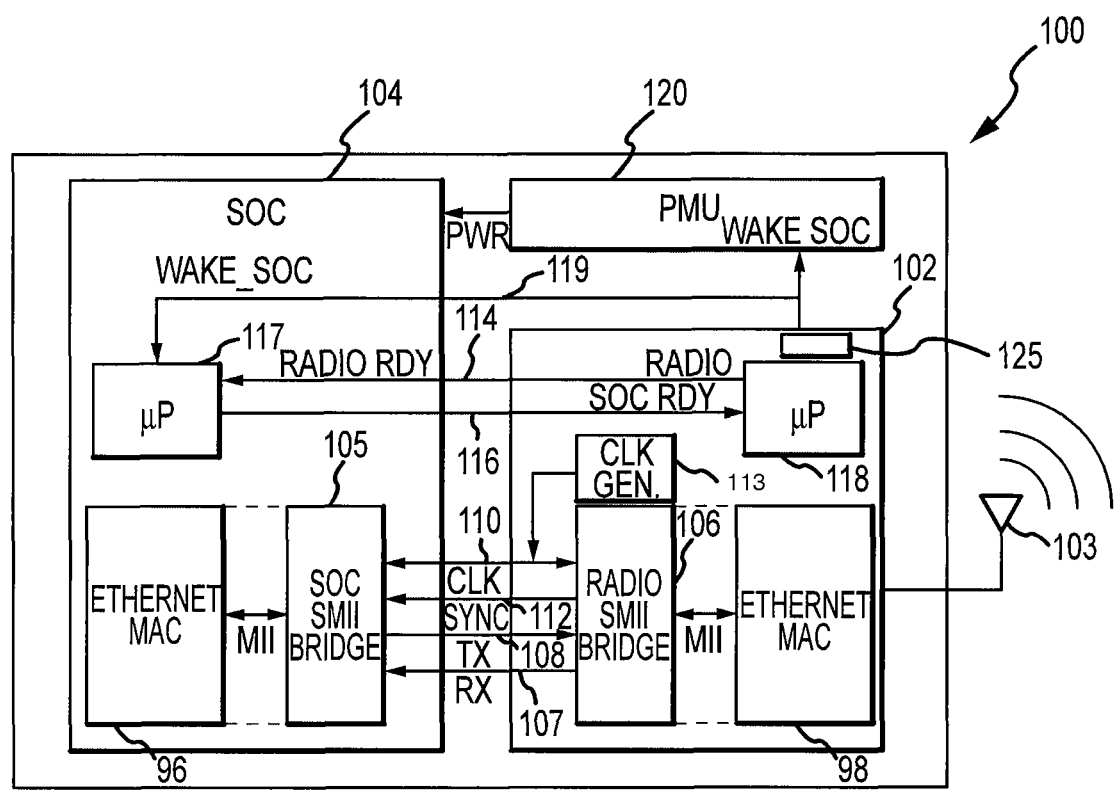
FIG. 1 illustrates an exemplary SOC radio interface.

FIG. 1 depicts an exemplary system 100 for providing an inter-processor communication IPC channel between two or more microprocessors 117 and 118 via a plurality of sideband signals (described in greater detail below). The microprocessors 117 and 118 may be implemented along with any variety of integrated circuitry. For example, the microprocessor 117 is shown as being implemented within an SOC 104 and the microprocessor 118 is shown as being implemented within a radio 102. In this manner, the radio 102 may couple to an antenna 103 to provide wireless communication to devices associated or communicating with the system 100. It should be noted, however, that the particular functionality of the chips communicating over the IPC channel, such as the SOC 104 and the radio 102, may change or be varied without departing from the spirit and scope of this disclosure.

As shown in FIG. 1, the SOC 104 and the radio 102 each may include a media access control unit (MAC) 96 and 98. The MACs 96 and 98 may be coupled together through bridges 105 and 106, thereby forming a direct MAC-to-MAC data link.

The particular method of coupling the SOC 104 to the radio 102 may vary between embodiments. The exemplary system 100 illustrates the SOC 104 and the radio 102 coupled together via a SMII standard, which is shown as one example of a suitable coupling protocol. Briefly, the SMII standard is a version of the IEEE 802.3 media-independent-interface (MII) standard for connecting 10/100 Mbit Ethernet MAC and PHY blocks. The SMII standard allows a single clock for the transmit and receive channels and lower pin counts than MII devices. Although this disclosure will discuss coupling the SOC 104 and the radio 104 to each other via the SMII standard, it should be appreciated that many other standards of interfacing the SOC 104 to the radio 102 are possible.

The bridges 105-106 that implement the SMII interface and translate media-independent-interface MII framing from the MACs 96 and 98. Between these bridges 105-106, SMII interface signals may be implemented including a receive (RX) signal 107, a transmit (TX) signal 108, a clock (CLK) signal 110, and a synchronization (SYNC) signal 112. The RX signal 107 may be used to send data from the radio 102 to the SOC 104. Likewise, the TX signal 108 may be used for transmitting data from the SOC 104 to the radio 102. In embodiments where the interface between the SOC 104 and the radio 102 is serial, then the RX signal 107 and/or the TX signal may be serial as well. The SYNC signal 112 may be used to indicate the beginning and the end of groups of data.

The CLK signal 110 may be generated by a clock generator 113 (described in further detail below) that is shown as residing within the radio 102. While the clock generator 113 is shown as residing within the radio 102 it should be appreciated that the clock generator may be located anywhere within the system 100, such as within the SOC 104, without affecting the overall operation of the system 100. Signals from the clock generation circuit 113, such as the CLK signal 110, may be used by the SOC 104 and radio 102. The CLK signal 110 may be used by the SOC 104 and/or the radio 102 to sample any one of the RX signal 107, the TX signal 108, and/or the SYNC signal 112.

Still with respect to FIG. 1, the microprocessors 117 and 118 may execute various functions associated with the SOC 104 and the radio 102. The SOC's microprocessor 117 may couple to the radio's microprocessor 118 via a RADIO_RDY signal 114. Similarly, the radio's microprocessor 118 may couple to the SOC's microprocessor 117 via a SOC_RDY signal 116. The RADIO_RDY signal 114 and the SOC_RDY signal 116 may be used by the microprocessors 117 and 118 to synchronize activity as they transition between low power states (described in detail below with regard to FIGS. 2-3). It should be noted that these transitions may occur independently of one another, as discussed in greater detail below. Furthermore, the system 100 may include a WAKE_SOC signal 119 coupled to a power management unit (PMU) 120. During operation, the WAKE_SOC signal 119 (described in detail below with regard to FIGS. 2-3) may request that the SOC 104 and/or the microprocessor 117 power up based upon performance needs of applications being executed by the system 100. The RADIO_RDY signal 114, the SOC_RDY signal 116, and the WAKE_SOC signal 119 are collectively referred to herein as "sideband" signals.

In some embodiments, the sideband signals may be implemented as general purpose input/output (GPIO) terminals of the radio 102 and/or SOC 104 such that the sideband signals may be capable of producing interrupts for the microprocessors 117 and 118.

Figure 2:
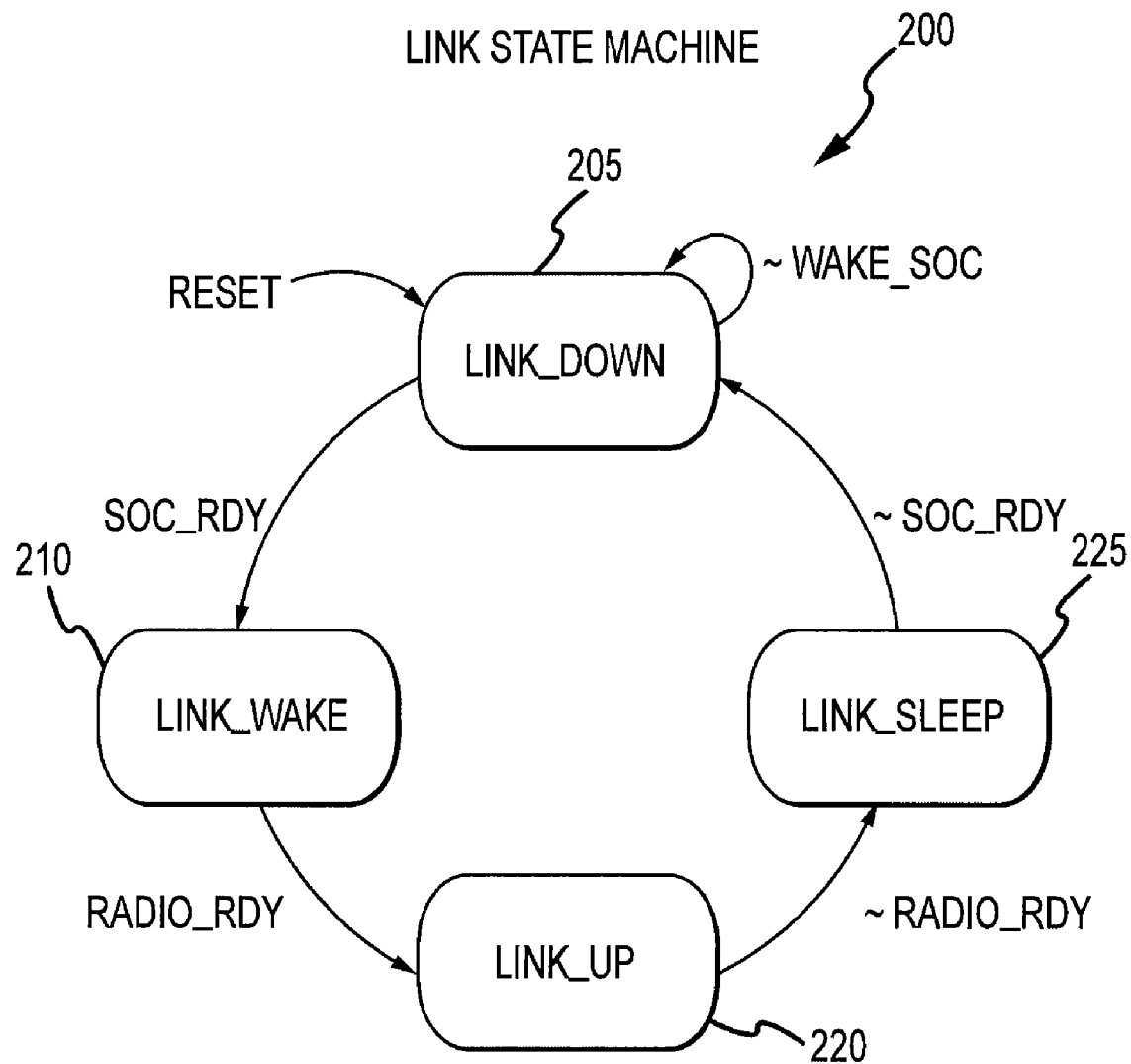
FIG. 2 illustrates an exemplary state machine.
Figure 3:
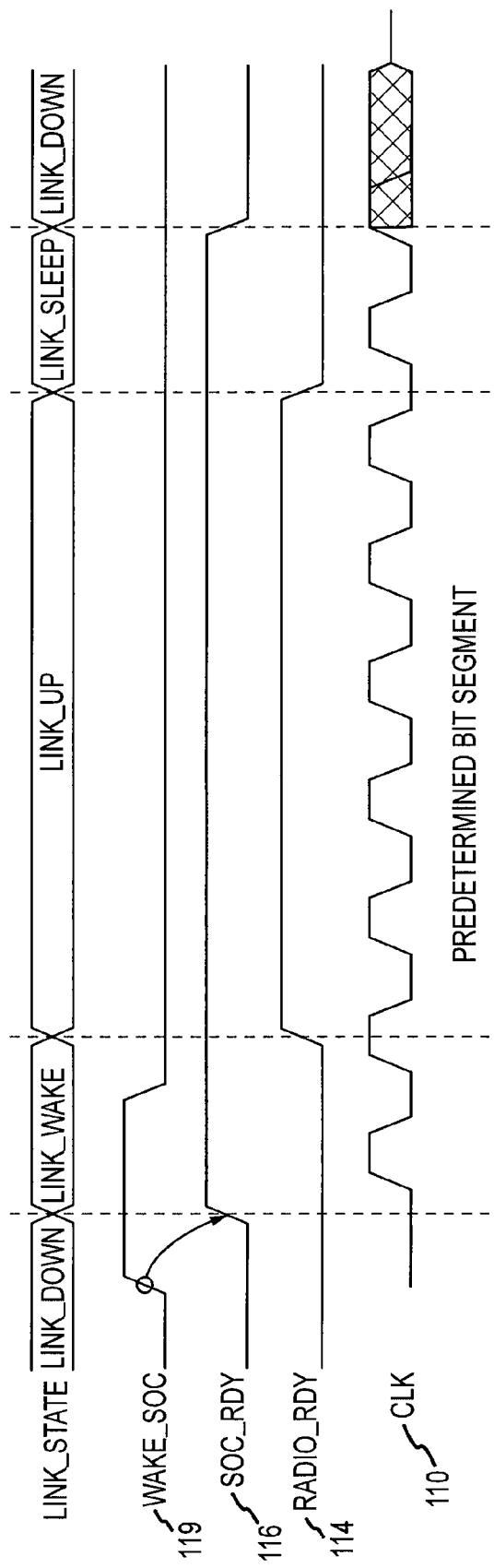
FIG. 3 illustrates an exemplary sequence diagram of the sideband signals.

FIG. 2 depicts an exemplary software state machine 200 that may execute on the SOC 104 and/or the radio 102 to monitor and drive the sideband signals as GPIOs. FIG. 3 illustrates the various sideband signals in the various states of the software state machine 200.

Referring to FIG. 2, the state machine 200 may begin with a LINK_DOWN state 205. During the LINK_DOWN state 205 the SMII interface signals (such as the RX signal 107 and the TX signal 108) may be idle since no data is being transferred between the SOC 104 and the radio 102. In this state, one of the chips, either the radio 102 or the SOC 104, may be free to enter its lowest power state, such as by clock scaling (described in further detail with regard to FIGS. 5A-5B), while the other chip may be fully operational.

FIG. 2 will be discussed with regard to the SOC 104 initially powered off and the radio 102 initially in its lowest power state (e.g., in the LINK_DOWN state 205). However, it should be appreciated that this discussion equally applies to the opposite situation where the radio 102 is initially powered off and the SOC 104 is initially in its lowest power state, also while in the LINK_DOWN state 205. Also, FIG. 2 will be discussed with regard to the radio 102 enacting the LINK_SLEEP state 225. The following discussion equally applies to the opposite situation where the SOC 104 enacts the LINK_SLEEP state 225. In these embodiments, the signal designations in FIG. 2 may be altered to reflect the change in roles. For example, if the roles were reversed, the WAKE_SOC signal used to wake up the SOC may be designated as WAKE_RADIO because it is the radio that is being woken up. It should also be appreciated that the state changes shown in FIGS. 2 and 3 occur as each side of the SMII connection are ready. Thus, neither the SOC 104 or the radio 102 forces the other to change power states.

Referring to FIGS. 2 and 3, to exit the LINK_DOWN state 205, the radio 102 may request a transition to a LINK_WAKE state 210 by asserting the WAKE_SOC signal 119, optionally, in conjunction with asserting the CLK signal 110 and/or the SYNC signal 112. (Note that the de-assertion or low state of the signals shown in FIG. 3 are indicated by the inclusion of a "~" before the name of the signal.) If, on the other hand, the WAKE_SOC signal 119 remains de-asserted (i.e., WAKE_SOC low), then the SOC 104 may remain in the LINK_DOWN state 205.

The assertion of the WAKE_SOC signal 119 by the radio 102 may be used to advise the SOC 104 that the radio 102 has requested that the SOC 104 transition from the LINK_DOWN state 205 to the LINK_WAKE state 210. In this manner, the radio 102 may generate a necessary but not sufficient condition for the SOC 104 to change power state. Once the WAKE_SOC signal 119 is asserted, the SOC 104 may assert the SOC_RDY signal 116 when it is ready to communicate with the radio 102 via the SMII connection, and the system 100 may enter the LINK_WAKE state 210. The LINK_WAKE state 210 may represent a transitional state on the way to a LINK_UP state 220. During the LINK_WAKE state 210, the radio's bridge 106 is operational and the radio 102 provides the CLK signal 110 and/or the SYNC signal 112.

In the LINK_WAKE state 210, once the radio 102 is capable of receiving data frames, it may assert the RADIO_RDY signal 114 to the SOC 104 and to transition the system 100 to transition to the LINK_UP state 220. Also in the LINK_WAKE state 210, the SOC 104 may have already asserted the SOC_RDY signal 116 to the radio 102 indicating it is prepared to receive frames but not prepared to transmit frames until the radio 102 asserts the RADIO_RDY signal 114.

During the LINK_UP state 220 the SMII connection between the SOC 104 and the radio 102 may be operational and available for full-duplex data transfer. That is, the radio 102 may be prepared to transmit and receive frames of data and the SOC 104 also may be prepared to transmit and receive frames of data. In the LINK_UP state 220 the radio 102 may be prepared to enter a low power state. For example, in some embodiments, the radio 102 may scale the CLK signal 110 provided by the clock generator 113 (described in further detail with regard to FIGS. 5A-5B). In the LINK_UP state 220, either the radio 102 or the SOC 104 may autonomously cause the system 100 to enter the LINK_DOWN state 205. For example, the radio 102 may transition back to the LINK_DOWN state 205 at any time by de-asserting the RADIO_RDY signal 114. Likewise, in the LINK_UP state 220, the SOC 104 may be free to drop into operational low power states by de-asserting the SOC_RDY signal 116. These operational lower power states may include various combinations of operating frequencies and operating voltages for the SOC 104. Furthermore, the voltages and frequencies chosen for these operational power states may be calibrated such that the bandwidth requirements of the SMII connection remain supported through all operational power states. In other words, there may be a certain data throughput associated with the SMII connection, and the voltages and/or frequencies for the operational low power states may be chosen such that entering these low power states does not affect the ability of the SOC 104 to support the data throughput associated with the SMII connection. Thus, in the LINK_UP state 220, the SOC 104 may reduce its operating voltage and/or operating frequency while maintaining the bandwidth set forth by the SMII connection, which in some embodiments is 100 Mb/s.

A LINK_SLEEP state 225 also may be provided between the LINK_UP state 220 and the LINK_DOWN state 205. In the LINK_SLEEP state 225, the radio 102 may continue to drive the CLK signal 110 and the radio 102 may continue to receive data frames from the SOC 104 to the radio 102 without transmitting data frames to the SOC 104. Once the radio 102 has de-asserted the RADIO_RDY signal 114, the SOC 104 may discontinue queuing any new data frames for transmission to the radio 102, yet the SOC 104 may continue operations until it independently desires to enter a low power state. Once the SOC 104 is ready to transition to a low power state, it may retire all previously queued frames and de-assert the SOC_RDY signal 116, thereby causing the system 100 to transition to the LINK_DOWN state 205 until either the SOC 104 or the radio 102 desire to exit the LINK_DOWN state 205.

FIG. 3 is a sequence diagram of the CLK signal 110 and the sideband signals in the various link states of the state machine 200. While the signals in FIG. 3 are illustrated as active high, where a transition from low to high indicates the assertion of the signal, the signals may be active low, where a transition from high to low indicates the assertion of the signal. The system 100 may begin to transition from the LINK_DOWN state 205 to the LINK_UP state 220 when the SOC 104 asserts the SOC_RDY signal 116. The assertion of the SOC_RDY signal 116 may begin to occur as a result of the WAKE_SOC signal 119 from the radio 102 being asserted. Alternatively, the assertion of the SOC_RDY signal 116 may begin to occur as a result of the SOC 104 requesting a data transfer via the TX signal 108. Full transition from the LINK_DOWN state 205 to the LINK_UP state 220 may occur once the radio 102 asserts the RADIO_RDY signal 114 as shown. Transition from the LINK_UP state 220 to the LINK_DOWN state 220 may begin to occur with the de-assertion of the RADIO_RDY signal 114 and full transition may occur when the SOC 104 de-asserts the SOC_RDY signal 116 as shown. Also, the radio 102 may provide the CLK signal 110 in all states but the LINK_DOWN state 205.

As described above in the context of FIGS. 2 and 3, the radio 102 may autonomously move between operational power states without notifying or relying on the SOC 104. Thus, in some embodiments, the radio's bridge 106 may be operational and even implementing power savings states without synchronizing these transitions with the SOC 104.

As mentioned previously, the radio 102 may generate a variable clock signal with the clock generator 113. In addition, some embodiments may include dynamic clock signal scaling based upon performance needs of the application being executed by the system 100. For example, in traditional SMII connections, the clock signals may be fixed at 125 MHz, which may exceed the needs of some implementations of the radio 102, such as radios employing baseband and/or Bluetooth signals. By generating the SMII clock signal and dynamically scaling it based upon the performance needs of the application being executed by the system 100, system power may be saved. In other words, the clock generator 113 within the radio 102 may be designed so as to save power when the SMII connection has been idle for a predetermined period of time. A substantial amount of the radio's 102 and the SOC's 104 power consumption may be attributed to transitioning between states. By scaling the frequency of the clock source that is provided to the SOC 104 and the radio 102 (i.e., clock generator 113), the overall number of transitions may be reduced, and as a result, the overall power consumption may be reduced. For example, instead of generating nominal fixed frequencies that are typical of SMII connections (e.g., 12.5 MHz) the clock generator 113 may generate a clock signal having a lower frequency. For example, in some embodiments, the clock generator 113 may generate a low-frequency clock signal that is approximately equal to a real-time-clock (RTC) frequency of 32.5 kHz, which may decrease the number of transitions by almost three orders of magnitude.

The clock generator 113 may take a variety of physical forms, in various embodiments, such as a crystal based oscillator. Such oscillators typically have relatively low phase noise and/or clock jitter. In other embodiments, the clock generator 113 may be a frequency synthesized signal based on a crystal oscillator signal, such as a phase locked loop (PLL) synthesizer. In some embodiments, the reduced frequency clock signal may be provided by dividing a higher frequency signal coming from the PLL and/or crystal oscillator. This reduced frequency, or scaled clock, may be selectively provided based upon whether certain signals are present in the SMII connection.

Figure 4A:
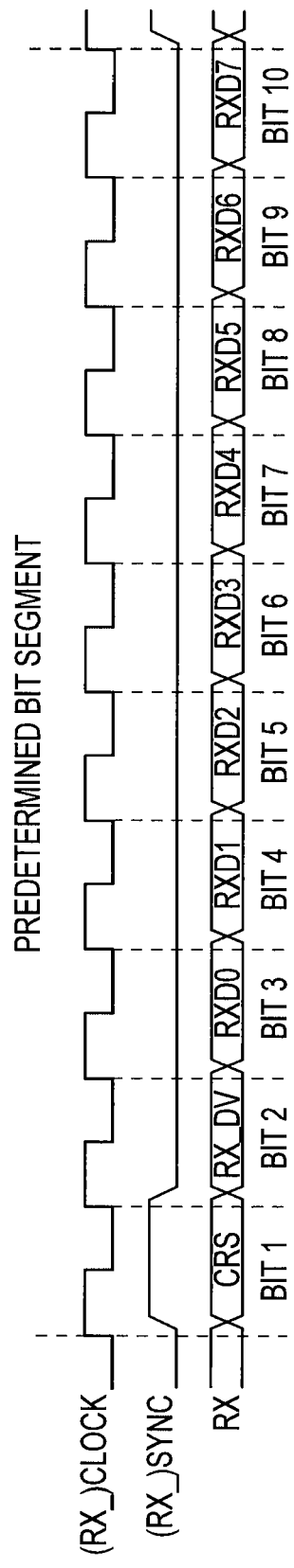
FIG. 4A depicts an exemplary receive sequence diagram.
Figure 4B:
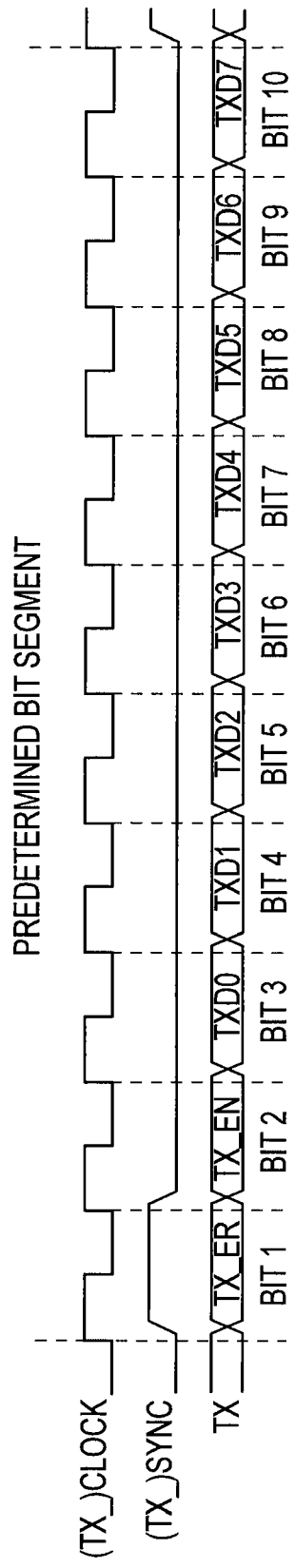
FIG. 4B depicts an exemplary transmit sequence diagram.

FIGS. 4A-4B illustrate exemplary SMII receive and transmit sequences between the bridges 105 and 106 that may be used to trigger reduced frequency operations. Referring to the exemplary transmit and receive sequences shown in FIGS. 4A-4B, data and control information between the SOC 104 and the radio 102 may be received and transmitted in predetermined bit segments. For example, as shown in FIGS. 4A-4B, the bit segment is shown as ten bits long, where the bit segment begins with a rising transition of the SYNC signal 112, and ends with the next rising SYNC signal 112. Thus, the length of the predetermined bit segment may be determined by the period of the SYNC signal 112. Although FIGS. 4A-4B happen to show this predetermined bit segment length as ten bits, other implementations with greater or fewer numbers of bits are possible.

The SMII interface may support variable transfer rate transfers between the SOC 104 and the radio 102, with each bit segment representing a new byte of data. In some embodiments, the SMII interface may support slower transfer rates by repeating the bit segment being communicated and sampling the repeated communication periodically. For example, the SMII interface may support a 100 Mbit transfer rate and also may support a 10 Mbit transfer rate by repeating the bit segment ten times and sampling any one of the ten repeated bit segments to achieve a 10 Mbit transfer rate.

Referring to FIG. 4A, the RX signal 107 may include ten separate bits that may convey certain information from the radio 102 to the SOC 104. The CRS bit (bit 1 in FIG. 4A) may be used to sense communication with the SOC 104. The RX_DV bit (bit 2 in FIG. 4A) may be used to indicate whether that receive data is being presented on the encoded data lines RXD7-0 (bits 3 through 10 in FIG. 4A) and that the CLK signal 110 is synchronous to the received data on RXD7-0.

Referring to FIG. 4B, the TX signal 108 may include ten separate bits that may convey certain information from the SOC 104 to the radio 102. The TX_EN bit (bit 2 in FIG. 4B) may indicate that valid data is being presented on the encoded data lines TXD7-0 (bits 3 through 10 in FIG. 4B) and that the CLK signal 110 is synchronous to the received data on TXD7-0.

Figure 5A:
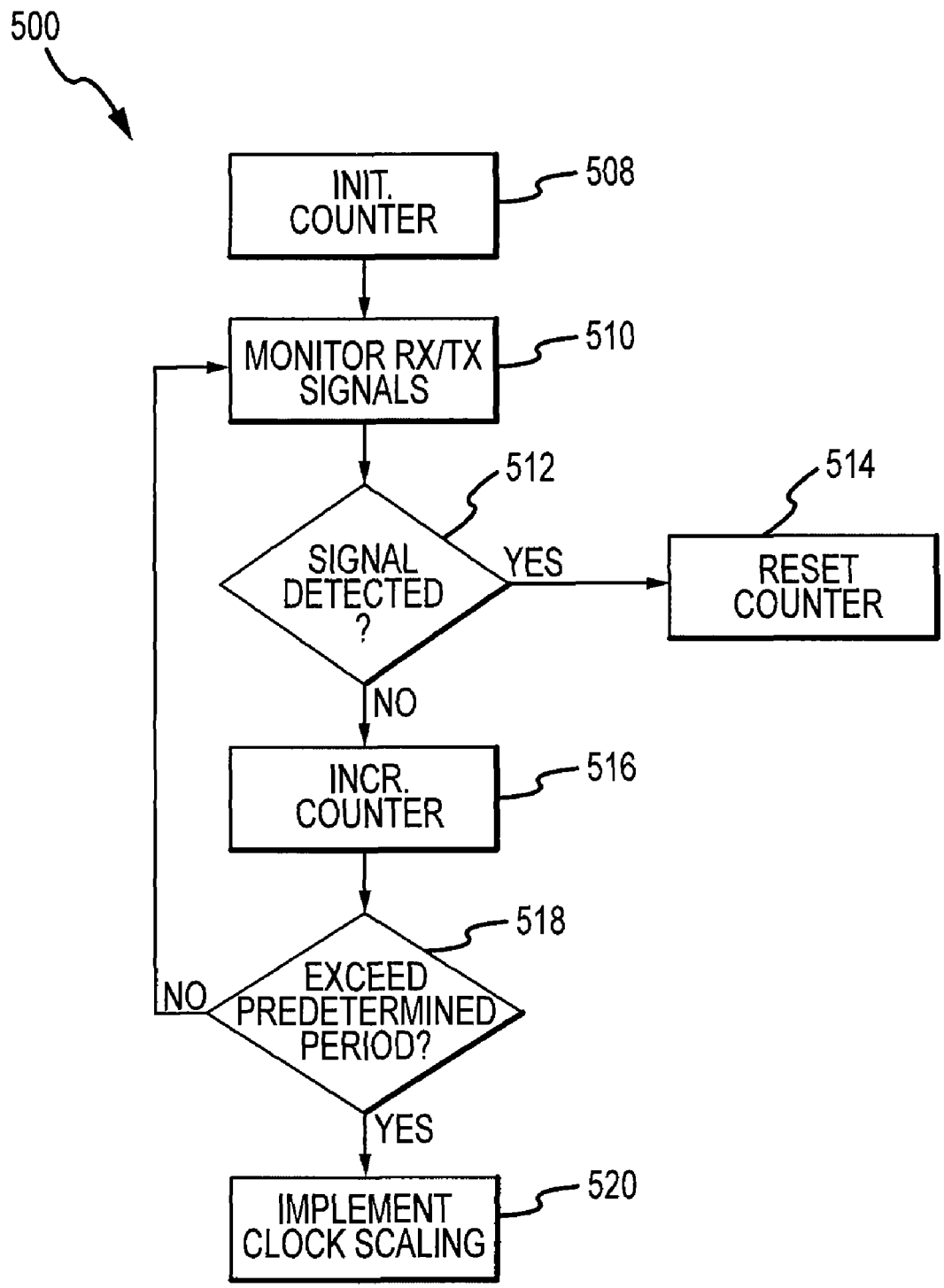
FIG. 5A is a flowchart illustrating an exemplary clock scaling operation.
Figure 5B:
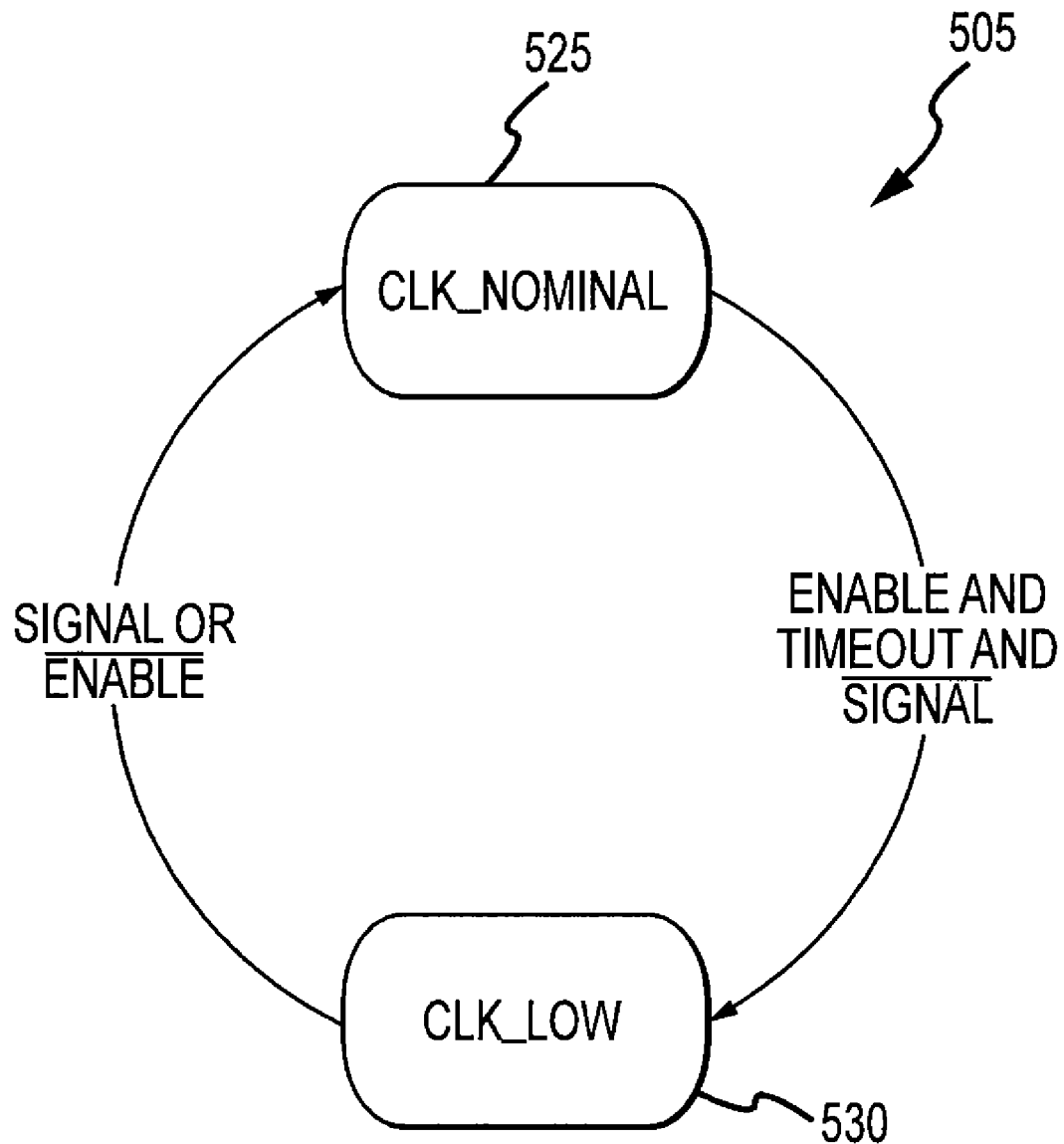
FIG. 5B illustrates an exemplary clock manager state machine.

FIG. 5A shows a flowchart 500 illustrating an exemplary clock scaling operation as used by certain embodiments. Dynamic clock scaling may be implemented in some embodiments because the transmission over the SMII connection may be slowing, and therefore, the clocks generated by the clock generation circuit 113 may be able to be dynamically scaled to correspond to the transmission load on the SMII connection. In this manner, clock scaling may provide power savings because the radio 102 and/or the SOC 104 may not be executing as many instructions. FIG. 5B depicts a clock manager state machine 505 showing exemplary states for a clock manager application that may execute on or in the radio 102 as it executes the operations of flowchart 500.

Referring to FIG. 5A, prior to executing the clock scaling operation, a counter (not specifically shown in FIG. 1, but which may be located within the radio 102), may be initialized to zero in operation 508. This counter may be used to determine periods of inactivity, and therefore, periods for which the radio 102 may provide a reduced frequency clock. In operation 510, the clock manager may monitor the TX_EN and RX_DV signals (shown in FIGS. 4A-4B) sent across the SMII connection established between the bridges 105-106. For SMII data frames, the TX_EN and the RX_DV signals are generally asserted one cycle after the SYNC signal 112 is asserted. Thus, the presence of the TX_EN and the RX_DV signals may indicate periods of activity on the SMII connection.

Operation 512 determines if a signal is present in the SMII connection by performing the logical operation of delaying the SYNC signal 112 by one cycle and looking for the presence of the TX_EN and/or RX_DV signals. If a signal is detected in operation 512, then the counter value may be reset in operation 514, indicating activity on the SMII connection.

In the event that a signal is not detected in operation 512, then operation 516 may be executed, wherein the counter is incremented to indicate that there is no activity on the SMII connection. In operation 518, if the counter value exceeds a predetermined maximum value then operation 520 is executed and the clock scaling described above is implemented. On the other hand, if the counter value does not exceed the predetermined value then operations 510 through 518 may be repeated.

Referring to FIG. 5B, the state machine 505 may begin in the CLK_NOMINAL state 525, wherein the nominal SMII frequency may be provided by the clock generator 113 because a signal is observed in operation 512. Referring momentarily back to FIG. 1, the radio 102 may include an enable register 125. In some embodiments, the enable register 125 may be part of, or accessible by, the microprocessor 118 and the software executed on the radio 102 may determine, based on the value in the enable register 125, whether it will implement low power optimization techniques. When power optimization is enabled and the predetermined period of time between signals on the SMII connection is exceeded per operation 518, then a timeout may occur and the state machine 505 may switch from the CLK_NOMINAL state 525 to a CLK_LOW state 530. Alternatively, the state machine 505 may switch from the CLK_LOW state 530 back to the CLK_NOMINAL state 525 if a signal is detected per operation 512 or if the low power optimization techniques are disabled in the register 125. When the state machine 505 switches from the CLK_LOW state 530 back to the CLK_NOMINAL state 525, the data bits following the TX_EN and/or RX_DV (i.e., TXD7-0 and/or RXD7-0 shown in FIGS. 4A-4B) may be processed by the system 100 at the nominal fixed clock rate. In some embodiments, this may occur within two cycles of the CLK signal 110.

Figure 6:
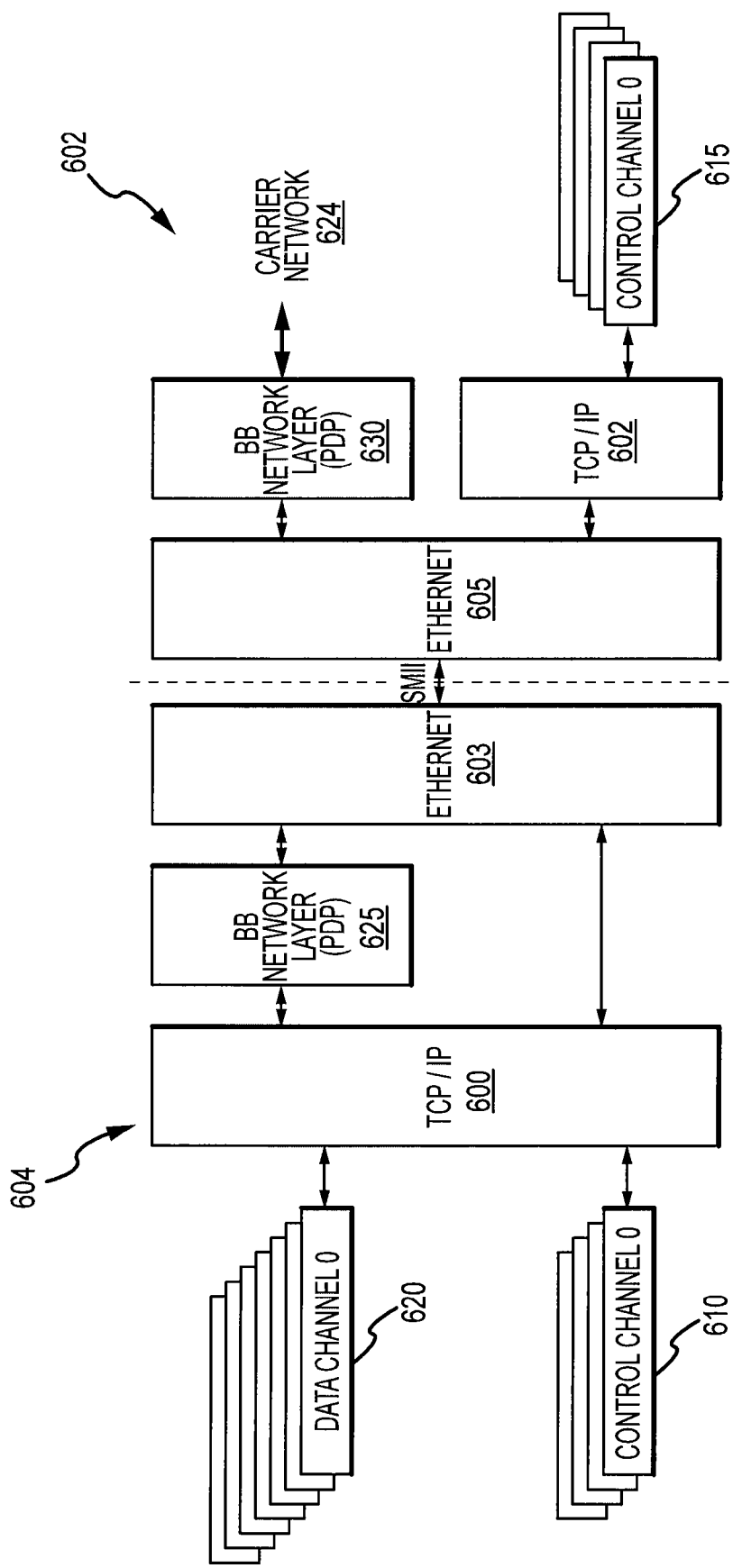
FIG. 6 represents an exemplary Ethernet based interface.

The Ethernet based interface between the SOC 104 and the radio 102 may include a transport layer, as shown in FIG. 6. The transport layer in FIG. 6 is shown as a TCP/IP transport layer (as indicated by blocks 600 and 602), although the actual transport protocol used may vary. In some embodiments, other transport layers may be used, such as the user datagram protocol or the datagram congestion control protocol. The TCP/IP transport layer may include control and data sessions between the radio 102 and the SOC 104. In addition, the TCP/IP transport layer may include data sessions between the radio 102 and other destinations external to the system 100.

As shown in FIG. 6, the SMII connection may be a point-to-point link between Ethernet blocks 603 and 605. Ethernet block 603 may be associated with the SOC 104 and the block 605 may be associated with the radio 102 as shown in FIG. 6. The SOC 104 may utilize one or more control channels 610 and the radio 102 may utilize one or more control channels 615. These control channels 610 and 615 may be used by the SOC 104 and/or the radio 102 for a variety of purposes such as configuring the radio 102 with the SOC 104, setting up one or more data channels 620, and for debugging to name but a few purposes.

The control channels 610 and 615 may consume less overall bandwidth than the data channels 620, but the priority of the control channels 610 and 615 should be sufficiently high enough to prevent commands and/or responses from causing hard failures, such as missing a data packet. Although missing a data packet is not desirable, in most cases, the missing data packet will not be fatal to data communication. In some embodiments, one or more computationally expensive functions associated with preventing hard failures may be disabled. For example, if the transport layer is TCP, the TCP checksum function may be disabled because the SOC 104 and the radio 102 may be connected over a point-to-point Ethernet link (vis-à-vis Ethernet blocks 603 and 605) and may therefore be protected by Ethernet cyclic-redundancy-checking.

The control channels 610 and 615 may be created by the SOC 104 sending a frame to a port on the radio 102, where this port may be a variety of ports such as TCP and/or UDP. In the embodiments where the port is a TCP port, this frame may be a TCP <SYN> frame. After the radio 102 receives this frame, the SOC 104 and the radio 102 may handshake to establish a connection. The TCP source port may be used to differentiate control channels dedicated to different purposes.

The control channels 610 and 615 may remain active until terminated. Since the control channels 610 and 615 may remain active until terminated, and since the SOC 104 and the radio 102 may enter and exit low power modes as a function of data being present on the interface connecting the SOC 104 and the radio 102, TCP session timeouts may be minimized or even eliminated in some embodiments. In other words, sessions pertaining to the control channels 610 and 615 may remain active through low power and even deep sleep events of the SOC 104 and/or the radio 102. Thus, the control channels 610 and 615 may remain active until the SOC 104 and the radio 102 agree to terminate the particular control channel through a traditional TCP channel teardown process.

Figure 7A:
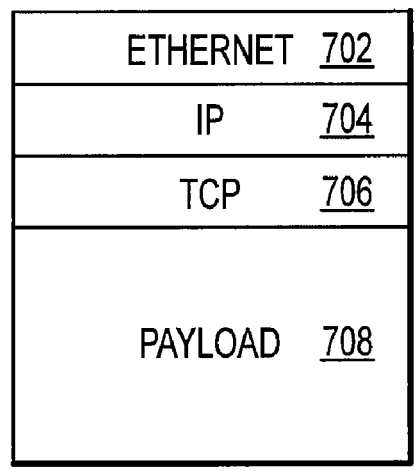
FIG. 7A illustrates an exemplary control channel header.

An exemplary control channel header stack 700 is illustrated in FIG. 7A. The header stack 700 may include a number of stack elements to implement a TCP/IP standard over Ethernet including an Ethernet header 702, an internet protocol (IP) header 704, a TCP header 706, and a payload 708. The precise TCP source and destination port numbers and IP addresses that the SOC 104 and the radio 102 agree to use may vary. Also, the precise format of the payload 708 may vary.

Referring again to FIG. 6, the SOC 104 may execute applications that communicate to "endpoints" on a carrier network 624 over the data channels 620. These endpoints may include SOCs other than SOC 104 at other locations on the network. Software applications on the SOC 104 may negotiate the creation of the packet data protocol (PDP) contexts 625 and 630. In some embodiments, the PDP contexts 625 and 630 may be the local baseband interface as shown in FIG. 6.

In some embodiments, the data channel 620 may be assumed to be a reliable transport between endpoints on the network, and therefore, it may be unnecessary to wrap the frames for the data channel 620 in another TCP header to support communication between the SOC 104 and the radio 102. Accordingly, in some embodiments, Ethernet encapsulation of PDP datagrams may be implemented where an Ethertype field may be set to indicate use.

In creating a data session between the SOC 104 and the radio 102, software executing on the SOC 104 may request the creation of the PDP contexts 625 and 630 by communicating with the radio 102 over previously established control channels 610 and 615. The PDP contexts 625 and 630 may provide to SOC software applications a communication path to the carrier network 624, thereby allowing it to open data sessions with remote endpoints. In this manner, the radio 102 may not terminate data sessions, and instead, it may provide an IP forwarding service.

The PDP contexts 625 and 630 may be terminated using a previously created control channel, such as the control channels 610 and 615.

Figure 7B:
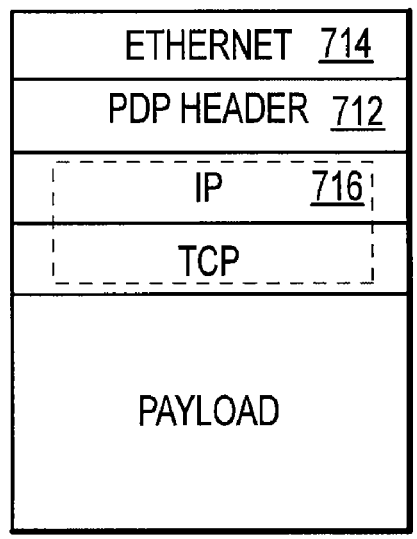
FIG. 7B illustrates an exemplary data control channel header.

An exemplary data channel header stack 710 is illustrated in FIG. 7B. As shown, a PDP context header 712 may be included between the Ethernet header 714 and the TCP/IP datagram 716. When the SOC 104 receives frames from the radio 102, the Ethertype field may indicate that the frame contains a PDP header 712. The SOC 104 may strip the Ethernet header 714 and the PDP header 712 and direct the underlying TCP/IP datagram 716 to the TCP stack for termination. As the TCP/IP datagram 716 is transmitted, the SOC 104 may take the outgoing datagram 716 and apply a PDP and Ethernet encapsulation while queuing the data frame to be transmitted to the radio 102 of the SMII link.

Figure 8:
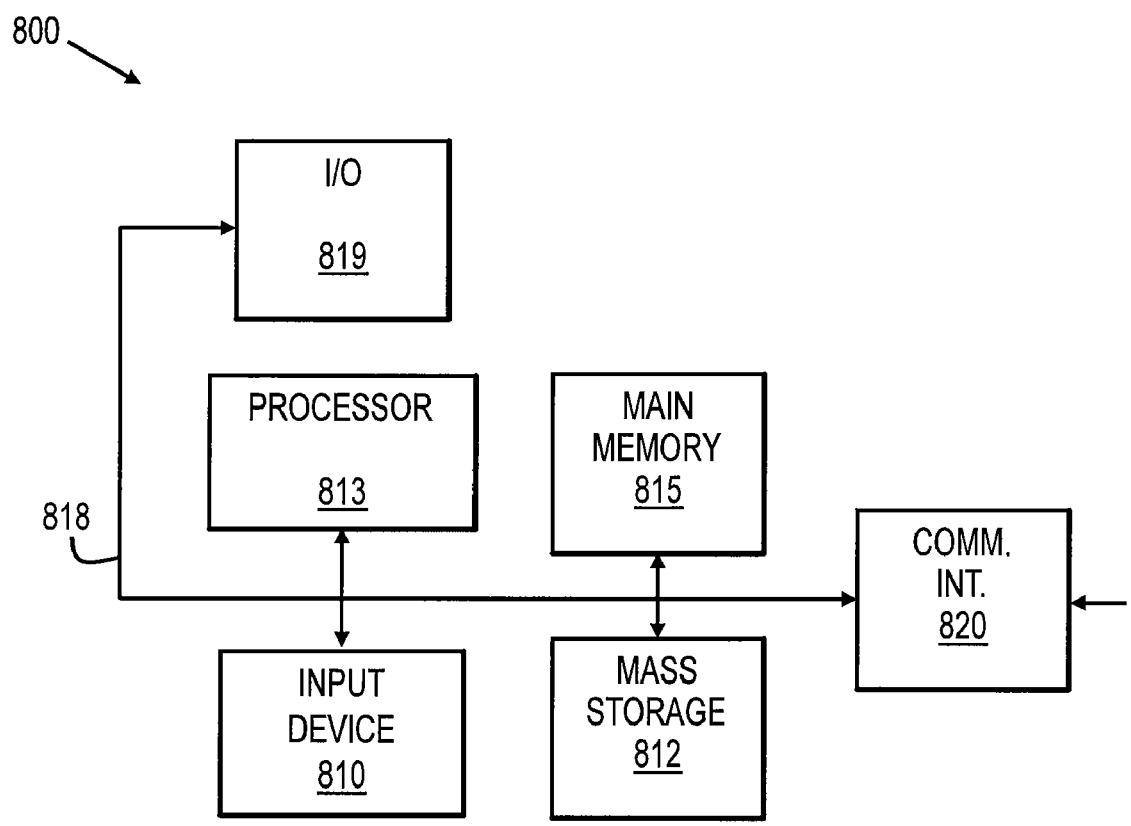
FIG. 8 depicts an exemplary computer system.
The use of the same reference numerals in different drawings indicates similar or identical items.

FIG. 8 illustrates an exemplary computer system 800 that may include the system 100 and/or the SOC 104 and the radio 102. In some embodiments, the computer system 800 may be a personal computer, while in other embodiments, the computer system 800 may be a handheld electronic device, such a personal media device. For the sake of discussion, the computer system 800 will be referred to herein as a portable media device. A keyboard 810 and mouse 811 may be coupled to the portable media device 800 via a system bus 818. The keyboard 810 and mouse 811, in one example, may introduce user input to portable media device 800 and communicate that user input to a processor 813. Other suitable input devices may be used in addition to, or in place of, mouse 811 and keyboard 810. An input/output unit 819 (I/O) coupled to system bus 818 represents such I/O elements as a printer, audio/video (A/V) I/O, etc.

Media device 800 also may include a video memory 814, a main memory 815 and a mass storage 812, all coupled to system bus 818 along with keyboard 810, mouse 811 and processor 813. Mass storage 812 may include both fixed and removable media, such as magnetic, optical or magnetic optical storage systems and any other available mass storage technology. Bus 818 may contain, for example, address lines for addressing video memory 814 or main memory 815. System bus 818 also includes, for example, a data bus for transferring data between and among the components, such as processor 813, main memory 815, video memory 814 and mass storage 812. Video memory 814 may be a dual-ported video random access memory. One port of video memory 814, in one example, is coupled to video amplifier 816, which is used to drive a monitor 817. Monitor 817 may be any type of monitor suitable for displaying graphic images, such as a cathode ray tube monitor (CRT), flat panel, or liquid crystal display (LCD) monitor or any other suitable data presentation device.

In some embodiments, processor 813 is a microprocessor manufactured by Motorola, such as the 680XX0 processor, or a microprocessor manufactured by Intel, such as the 80×86, or Pentium® processor. In other embodiments, the microprocessor 813 may be an embedded microprocessor within other integrated circuitry. Any other suitable microprocessor or microcomputer may be utilized, however.

Media device 800 also may include a communication interface 820 coupled to bus 818. Communication interface 820 provides a two-way data communication coupling via a network link such as the carrier network 624 shown in FIG. 6. In some embodiments, communication interface 820 may be an integrated services digital network (ISDN) card or a modem, a local area network (LAN) card, or a cable modem or wireless interface. In any such implementation, communication interface 820 sends and receives electrical, electromagnetic or optical signals which carry digital data streams representing various types of information.

Code received by media device 800 may be executed by processor 813 as it is received, and/or stored in mass storage 812, or other non-volatile storage for later execution. In this manner, media device 800 may obtain application code in a variety of forms. Application code may be embodied in any form of computer program product such as a medium configured to store or transport computer readable code or data, or in which computer readable code or data may be embedded. Examples of computer program products include CD-ROM discs, ROM cards, floppy disks, magnetic tapes, computer hard drives, servers on a network, and solid state memory devices.

Although the present invention has been described with reference to preferred embodiments, persons skilled in the art will recognize that changes may be made in form and detail without departing from the spirit and scope of the invention. For example, while embodiments related to portable media devices are disclosed, persons skilled in the art will recognize that the application has broad application and will recognize that the IPC channel and sideband signals disclosed herein may be employed as a method of communication between chips within any variety of electrical devices such as a router, phone, portable music player, and so on.

What is claimed is:

1. An electronic device comprising:
    a first integrated circuit (IC);
    a second IC coupled to the first IC via a communication interface, wherein the first IC is in one or more low power states and unable to monitor the communication interface; and
    an inter-processor communication (IPC) channel coupled between the first and second ICs, wherein the IPC channel is separate from the communication interface and wherein the second IC generates at least one advisory signal to the first IC via one or more sideband signals;
    wherein the second IC comprises a clock generation circuit, and
    wherein the clock generation circuit is substantially off while the first IC is in one or more low power states and the second IC is in a non-low power state.

2. The electronic device of claim 1, wherein the second IC continues operations while the first IC is in the one or more low power states.

3. The electronic device of claim 1, wherein the clock generation circuit generates a clock signal and wherein a frequency of the clock signal is reduced by at least three orders of magnitude while the first IC is in the one or more low power states.

4. The electronic device of claim 1, wherein the one or more sideband signals are used by the first IC and the second IC to transition to one or more low power states.

5. The electronic device of claim 4, wherein the at least one advisory signal is implemented as general-purpose-input-output signal.

6. The electronic device of claim 5, the first IC further comprising a first processor and the second IC comprising a second processor, wherein the one or more sideband signals are capable of producing at least one interrupt for the first or second processors.

7. The electronic device of claim 1, wherein the second IC autonomously initiates one or more low power states and synchronizes transitioning to the one or more low power states with the first IC using the at least one advisory signal.

8. A media device comprising:
    a central processing unit (CPU);
    a memory coupled to the CPU;
    a system on a chip (SOC) coupled to the CPU;
    a radio coupled to the SOC using a serial-media-independent-interface (SMII), the radio comprising a clock generator, wherein the clock generator provides a synchronous timing signal to the SMII; and
    a power management unit (PMU) coupled to both the SOC and the radio, wherein the PMU is configured to provide an advisory power down signal to the SOC as directed by the radio, wherein
    the clock generation circuit is substantially off while the SOC is in one or more low power states and the radio is in a non-low power state.

9. The media device of claim 8, further comprising one or more sideband signals that are unrelated to the SMII.

10. The media device of claim 9, wherein the one or more sideband signals are used by the SOC and the radio to transition to one or more low power states.

11. The media device of claim 10, wherein the one or more sideband signals are implemented as general-purpose-input-output signals.

12. The media device of claim 11, wherein the sideband signals are capable of producing at least one interrupt for the CPU.

\* \* \* \* \*